March 30, 1948. M. WATTER 2,438,730
COMPUTING DEVICE
Filed Nov. 14, 1944 4 Sheets-Sheet 1

INVENTOR
Michael Watter.
BY

March 30, 1948. M. WATTER 2,438,730
COMPUTING DEVICE
Filed Nov. 14, 1944 4 Sheets-Sheet 2
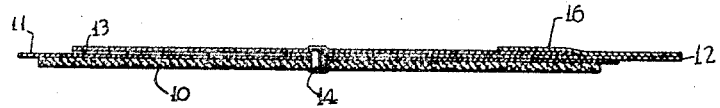
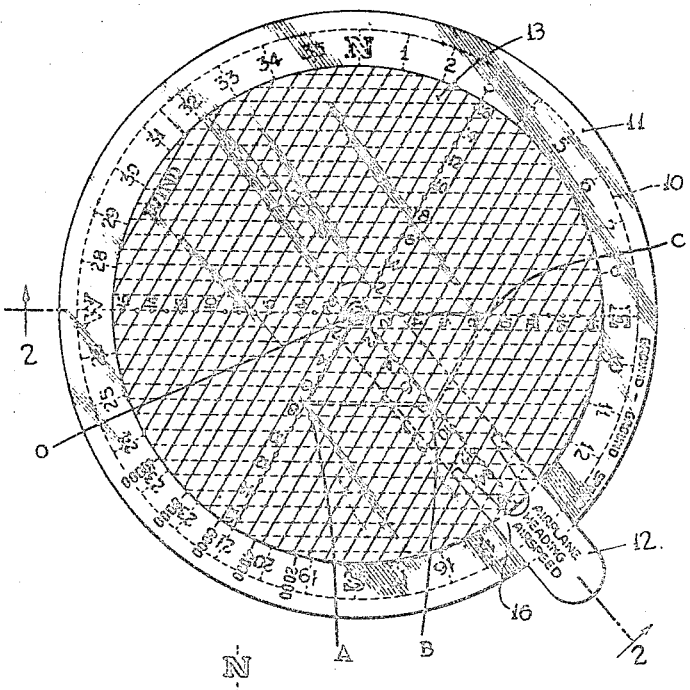
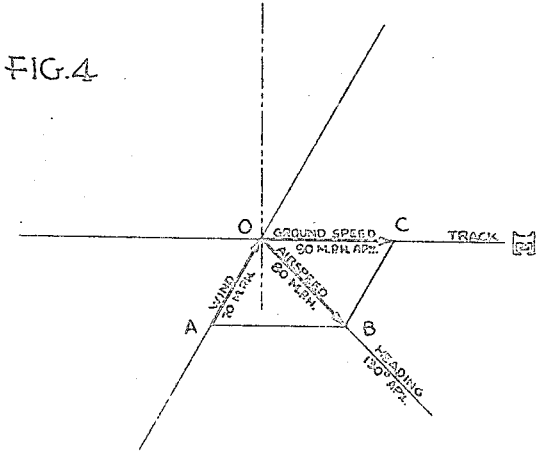
INVENTOR
Michael Watter
BY March 30, 1948. M. WATTER 2,438,730
COMPUTING DEVICE
Filed Nov. 14, 1944 4 Sheets-Sheet 3

INVENTOR
Michael Watter.
BY

Patented Mar. 30, 1948

2,438,730

UNITED STATES PATENT OFFICE 2,438,730

COMPUTING DEVICE

Michael Watter, Philadelphia, Pa.

Application November 14, 1944, Serial No. 563,343

6 Claims. (Cl. 235—61)

This invention relates to a computing device, particularly to a device for solving vector problems, and has for an object the provision of improvements in this art. The device is herein described specifically in connection with the solution of navigational problems for aircraft, though without limitation to use in this or any other definite field.

One of the particular objects of the invention is to provide a simple device for quickly solving problems involving vector analysis, preferably a device which can be operated by one hand, leaving the operator's other hand free to manipulate controls, as of an airplane in flight.

Another object is to provide a device which can be inexpensively manufactured, yet will be very durable in service.

Another object is to provide a device having few and small parts adapting it to be easily carried about, as for example, in the operator's pocket.

The above and other objects of the invention and various features of novelty will be apparent from the following description of an exemplary embodiment thereof, reference being made to the accompanying drawings, wherein:

Fig. 2 is an axial section through the device;

Fig. 3 is a plan view of the device showing parts in position for the solution of a navigational problem;

Fig. 4 is a diagram of the computation illustrated in Fig. 3;

The device comprises a plurality of rotatable members, some transparent in whole or in part, provided each with a series of parallel lines which are so disposed, as for example, parallel to a base diameter, that the lines of two or more members form parallelograms from which various problems can be solved. These lined rotatable members are preferably formed as circular plates, sheets or disks and may be associated with a base plate or disk carrying indicia of direction, for example, a compass rose. Also there is provided a member which is similar to the lined disks but which may be an incomplete disk, for example, a narrow strip or arm carrying a single radial line. The lines of the two associated disks thus may form the sides of a parallelogram; the arm may form the diagonal or resultant; and the compass rose may provide directional orientation.

Figure 1:
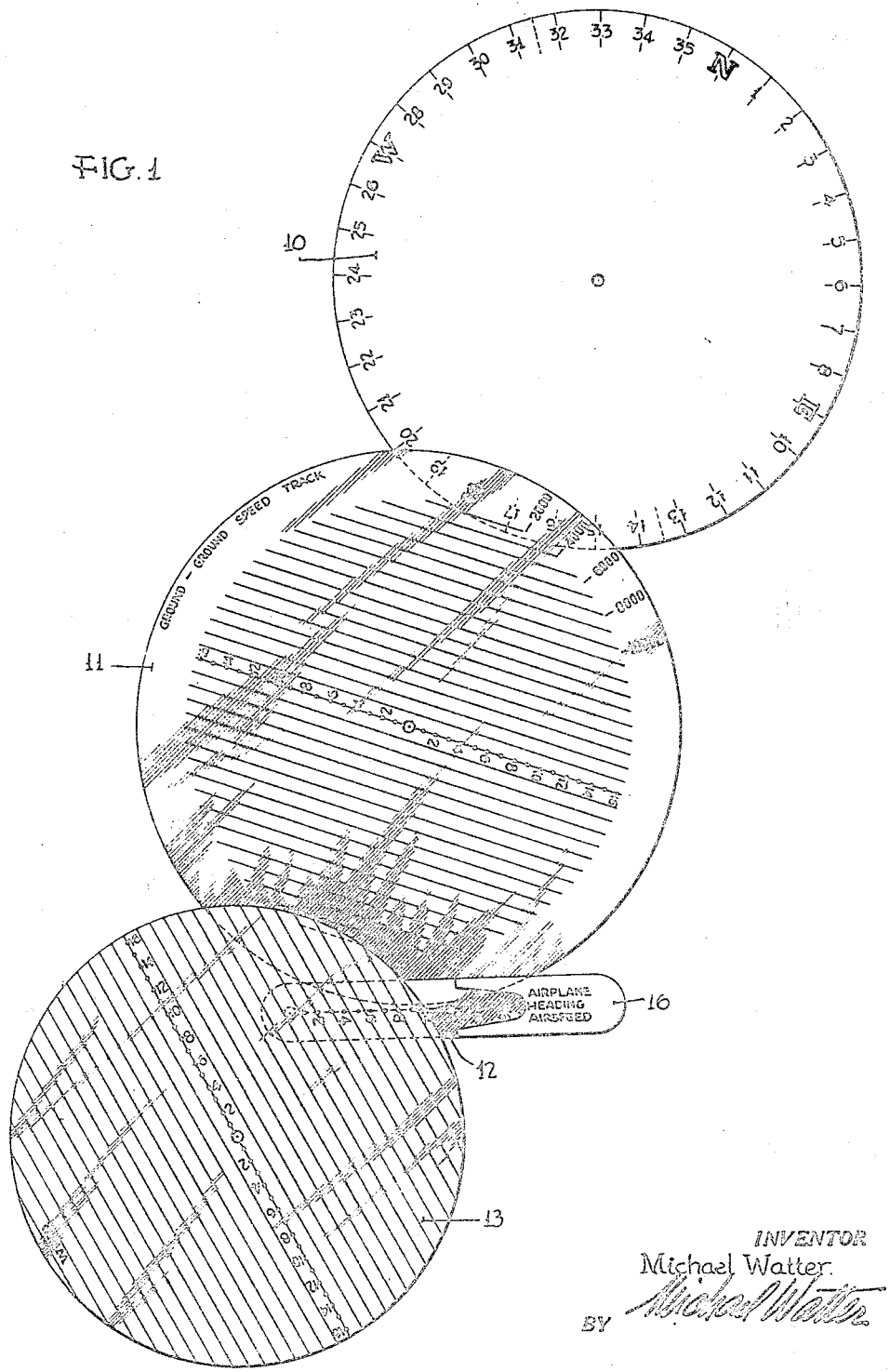
Fig. 1 is an exploded isometric view of a device embodying the invention.

These several members are shown connected in Fig. 2 and separated in Fig. 1. The base plate or compass rose is designated by the numeral 10, the first lined disk thereabove by the numeral 11, the radial arm by the numeral 12, the second lined disk by the numeral 13, and a hub pin by the numeral 14. The pin 14 holds the members 10, 11, 12 and 13 together under friction but not under sufficient friction to prevent easy turning movement by the hand. Further frictional engagement between the arm 12 and the disk 13 is provided by a resilient clip 16 secured to the outer end of the arm and embracing the outer edge of the disk. When either the disk or the arm is moved it moves the other unless held against such conjoint movement.

The top disk 13 is transparent so that its lines may be seen superimposed upon the lines of the disk 11. The second lined disk 11 may also be transparent, although transparency is actually needed only near the circumference to reveal indicia on the edge of the compass rose 10. If the disk 11 is enough smaller in diameter than the disk 10 it need not be transparent in any part; however, it is desired that disk 11 shall be of larger diameter than the compass rose so its edge will be exposed beyond the edge of disk 10, convenient for engagement by the fingers. The arm 12 is made of transparent material when it is located in a position above one of the upper or rotary disks, as here illustrated. All of the transparent members may be formed of Celluloid or other plastic; the base disk 10 is preferably formed of heavy cardboard. Preferably also the topmost disk 13 is formed with a mat surface finish in order that pencil marks may be made upon and removed from it.

The compass rose 10 is divided and marked around the circumference in degrees, the major points being designated, as usual, by letters such as N, E, S, W, and the terminal cipher of each degree number marking being omitted. Thus 36 designates 360 degrees, etc. The members 11, 12 and 13 have radial base lines marked to a common scale, the full disks 11 and 13 each having two aligned base line radii forming a diametral base line. All radial lines are divided into spaces of uniform length and are marked from zero at the center upward toward the outer edge. The parallel lines of disks 11 and 13 are spaced apart to the same scale as the markings on the radii. These markings may represent miles per hour, the terminal cipher being omitted. The markings shown run from zero to 160 M. P. H., common for private airplanes. For faster craft different markings or larger disks may be provided. The lines and indicia on the different disks are preferably mutually distinctive, as by being made of different colors.

The upper disk 13 is conveniently used to represent the direction and velocity of the wind, hence for convenient reference it is marked "Wind" or "Wind vector" on the edge. The arm 12 conveniently represents the direction and speed of the aircraft relative to the air, hence is marked "Airplane," "Airplane heading," "Airspeed" or "Path." The lower movable disk 11 conveniently represents the direction and speed of the airplane relative to the ground, hence is marked "Ground," "Ground speed," "Track" or "Course." On the edge of disk 11 there are also marked certain indicia of altitude in feet such as "2000," "4000," "6000," "8000," "10000," etc.

The device can best be understood from a consideration of the solution of some representative problems on the device.

*Airpath-wind-track relationship, Figs. 3 and 4*

Given any two of the above three factors, the third can be determined quickly with the device without extraneous notations or computations. More precisely, given any four of the six elements of the three pairs of factors (1) heading-airspeed, (2) wind direction-velocity, and (3) course-groundspeed, the other two can readily be computed.

Assume that the direction and velocity of the wind are known; that the airspeed of the aircraft is known; and that the desired course is known; the problem is to determine the necessary heading for the aircraft and the speed it will make along the plotted course.

To take a specific example, assume that the wind blows from 210 degree point of the compass at a velocity of 70 M. P. H.; that the aircraft airspeed is 80 M. P. H.; and that the course is to be due east, i. e., toward the 90 degree point. In all cases the wind is assumed to blow inward or toward the central axis; and the directions of travel along the course and heading are assumed to be outward or away from the central axis.

First, the "wind" disk 13 is turned until its diametral base line is directed toward the marking "21" (for 210 degrees) on the margin of the compass rose disk 10. Second, while holding the arm 12 to keep disk 13 from turning (through the frictional connection between the arm and the disk), the "ground" disk 11 is turned until its diameter is directed to the marking "E" on the compass rose disk, i. e., to the 90 degree point. Third, while holding both disks 11 and 13, the "airplane" or "heading" arm 12 is turned until the point on its radial base line at 8 (for 80 M. P. H.) falls upon a line on the "ground" disk 11 which passes through the point 7 (for 70 M. P. H.) on the diameter or base line of the "wind" disk 13. Fourth, while holding all parts against turning (since the problem has been solved and it is only necessary to read the answer), the "heading" direction is read on the compass rose disk and found to be approximately 139 degrees. Finally, while continuing to hold all parts against turning, the line on the "wind" disk which passes through the point at 8 on the "airplane" arm base line is followed to its intersection with the base line of the "ground" disk and the value of this point is read and found to be approximately 9 (for 90 M. P. H.). The operator now knows that in order to fly due east with the given wind direction and velocity and the selected airspeed he must head toward 139 degrees and that he will travel due east relative to the ground at about 90 M. P. H.

Where lines do not exactly correspond to a given unit the operator must interpolate, as is usual with other computing instruments, such as slide rules and the like. In the above and other examples given herein the approximate instrument readings are given rather than mathematical calculations.

Fig. 4 graphically illustrates the above problem in usual vector analysis form. Here OA or CB represents the direction and velocity of the wind, or wind-travel, or wind vector; OB represents the direction or heading and speed of the airplane relative to the air, or air-travel, or projected air path; and OC or AB represents the direction or course and speed of the airplane relative to the ground, or ground-travel, or track.

Figure 5:
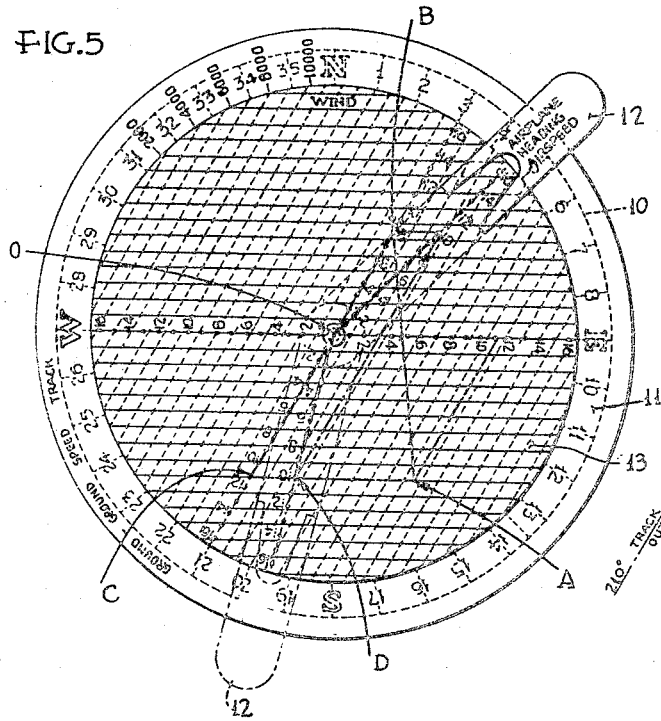
Fig. 5 is a plan view of the device showing the parts in position for the solution of another navigational problem.
Figure 6:
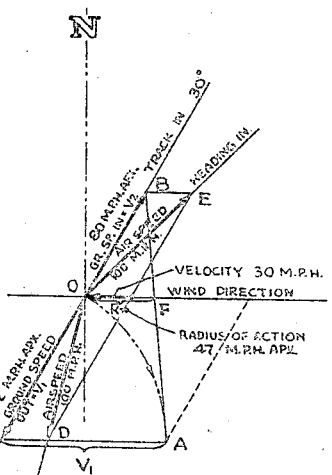
Fig. 6 is a diagram of the computation illustrated in Fig. 5.

*Radius of action, Figs. 5 and 6*

The radius of action (for a round trip along the same course) is the distance or track along a given course that an airplane can fly and return with a given supply of fuel at a given speed. The fuel consumption at a given air speed for one hour's flight being known for any given airplane, it is only necessary to determine the distance out and in along a given course that the airplane can fly in one hour. This range for one hour is here referred to as the radius of action. The full radius of action, then is simply the number of hours fuel supply multiplied by the radius of action for one hour. In mathematical terms, as given in any textbook on aerial navigation, the radius of action R is ground speed out multiplied by ground speed in, divided by ground speed out plus ground in; or $$R = \frac{V1 \times V2}{V1 + V2}$$

Assume that the airplane airspeed is 100 M. P. H.; that the wind is 30 M. P. H. from due east; and that the course out and in is along the 30–210 degree line.

First, set the "wind" disk 13 base line at E. Next, set the "ground" disk 11 base line on 3–21. Next, set the "airplane" or "heading" arm 12 at a point above the "wind" disk base line where 10 (100 M. P. H.) intersects the wind velocity line 3 (30 M. P. H.), which is parallel to the "ground" base line and passes through 3 on the "wind" base line; then follow back along a parallel "wind" disk line from the point of intersection to the "ground" base line. This is approximately 8 or 80 M. P. H. ground speed along the course or track. This may be called the "track in" and "ground speeed in" for reference. Next, set the "airplane" arm 12 at the point below the "wind" disk base line where 10 (100 M. P. H.) intersects the wind velocity line 3 (30 M. P. H.) and follow back along a parallel line from the intersection to the "ground" base line. This is approximately 11.2, or 112 M. P. H. ground speed along the track. This may be called the "track out" and "ground speed out" for reference.

There has now been charted the ground speed in, V2, 80 M. P. H., or distance for one hour's flight against the wind, and the ground speed in, V1, 112 M. P. H., or distance for one hour's flight with the wind.

Now, by a system of triangles which can readily be set up on the device as thus held, and by the use of a single straight edge (which is practically always available in some convenient form), the radius of action can readily be read off. Make a base line through V1 (112 M. P. H.) parallel to the "wind" base line and equal to V1. This can be done by compass or can be done visually by finding the point 11.2 on the "wind" base line and following down a line parallel to the "ground" base line until it intersects a line through 11.2 on the "ground" base line which is parallel to the "wind" base line. Keeping this point in view, either by observation or by marking it with a dot, a straight edge is placed through the dot and the point V2 (80 M. P. H.) on the "ground" base line. Where the straight edge line crosses the "wind" base line marks the limit of the radius of action R.

This is seen to be true by a comparison of similar sides of similar triangles. Referring to Fig. 6, the triangle BOF is similar to BCA; hence OB is to OB plus OC as OF is to AC. Now, since OB is V2, or 80 M. P. H.; and OC (or AC) is V1, or 112 M. P. H.; then OF or R equals $V2 \times V1$ divided by $V2+V1$, or $80 \times 112$ divided by $80+112$. Reading on the "wind" base line, the radius of action is approximately 4.7 or 47 M. P. H.

Figure 7:
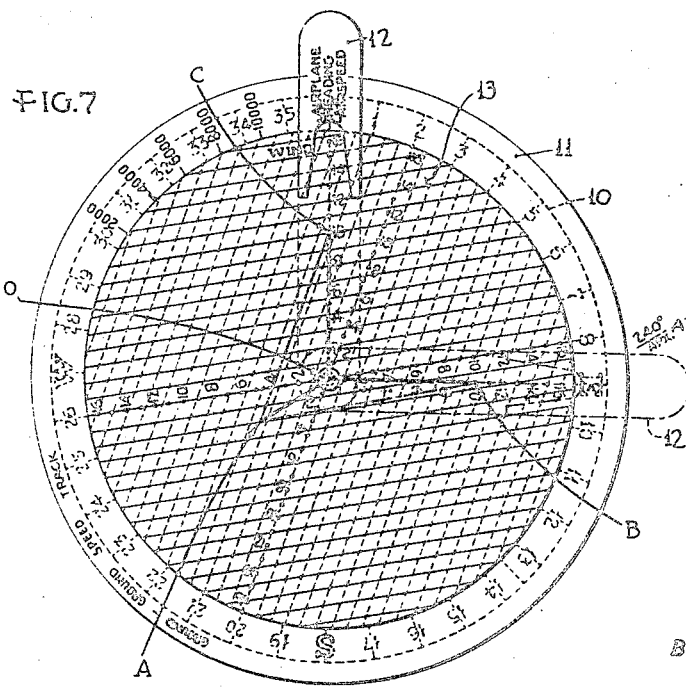
Fig. 7 is a plan view of the device showing the parts in position for the solution of another navigational problem.
Figure 8:
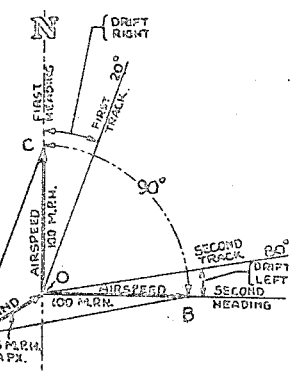
Fig. 8 is a diagram of the computation illustrated in Fig. 7.

*Determination of wind vector, Figs. 7 and 8*

An example will be given for determining the wind vector by the double drift method, that is to say, by flying along two different headings, preferably at right angles to each other. The angle of drift may be determined by a standard drift indicator. In the absence of a drift indicator and for simplicity, it will be assumed that the pilot flies a first heading from some monument or landmark directly north; then flies a second heading directly east from the same monument. If at any time after leaving the monument the pilot sights back on it and measures the angle between the sighting and the heading, he has found the drift angle. Suppose when he heads north he finds that the drift angle is 20 degrees toward the east; and that when he heads east he finds that the drift angle is 10 degrees toward the north. The airspeed will be assumed to be 100 M. P. H. and it will also be assumed that he flies each heading for one hour, though actually to determine the angle of drift he need fly only a very short time.

In solving this problem the "wind" disk is used in a manner different from that denoted by its marked designation. It is used as a ground disk, the "ground" disk itself retaining its usual function, and the same of the "airplane" arm.

The base line of one of the disks is turned to one of the courses (that is, one of the headings plus or minus the angle of drift as required) and the base line of the other disk is turned to the other course. The basic system of parallelograms has now been set up. The "airplane" arm base line is in succession set on the headings N and E and lines are followed back from the airspeed 10 (for 100 M. P. H.) parallel to the two base lines. The point where these two lines intersect locates one end of the wind vector, the other end being at the center of the disks. It may be necessary to mark one of these intersecting lines on the disk or to place a straight edge on the disk while moving the "airplane" arm to the second position to locate the second intersecting line. However, with some practice one can note the crossings of the base line made by the intersecting lines and remember their values until the problem has been solved.

Fig. 8 graphically illustrates this problem. Here OC is the north heading; OB is the east heading; and A is the point of intersection of the determining lines AC and AB which are drawn parallel to the two tracks in the manner set forth above. AO then, is the wind vector sought. The wind direction, of course, is known by reason of the direction of drift in the two flights. The wind velocity is approximately 55 M. P. H.

Figure 9:
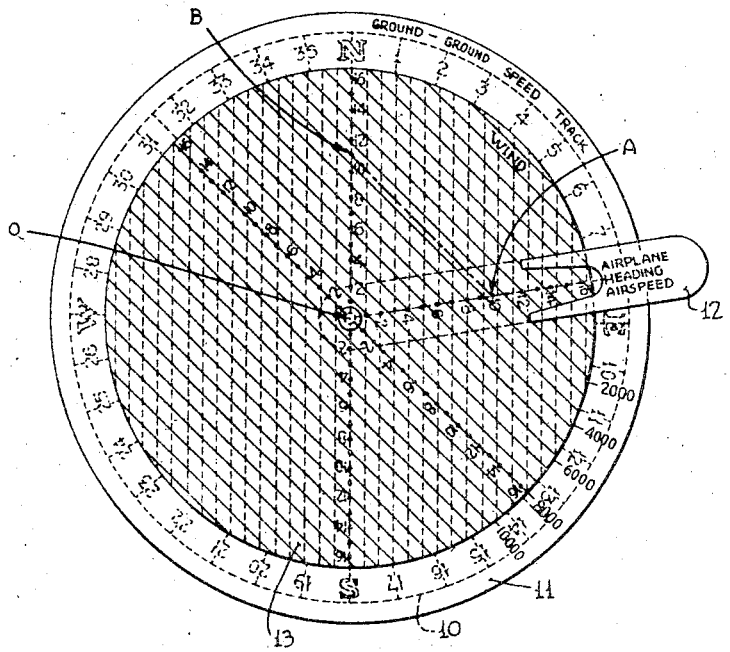
Fig. 9 is a plan view of the device showing the parts in position for the solution of still another navigational problem.
Figure 10:
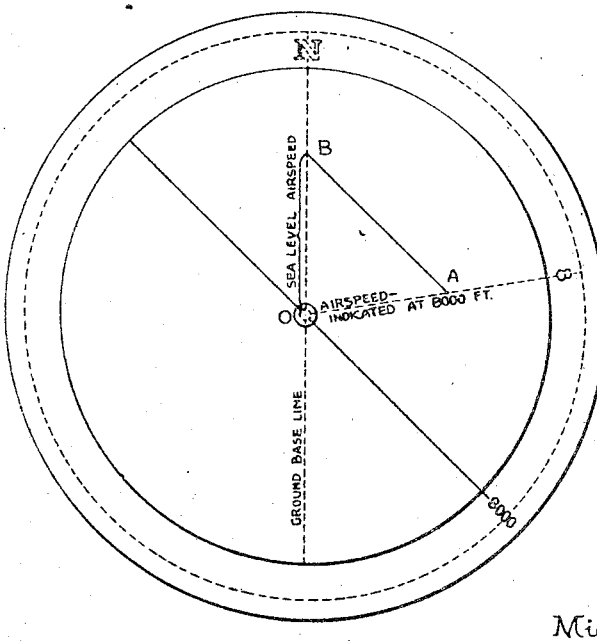
Fig. 10 is a diagram of the computation illustrated in Fig. 9.

*Airspeed at altitude and sea level, Figs. 9 and 10*

If the airspeed at sea level or at a given altitude is known, it may be desirable to compute the other for assumed standard temperature values. For this computation, some other markings on the disks and other assigned values will be followed. The "ground" disk, as stated above has certain altitude markings placed at given points on its edge over the edge markings of the compass rose. These altitude markings are originally so placed as to be east of a N—S line, hence for this computation the "ground" disk diametral base line is placed on the N—S line of the compass rose in such position that the altitude markings lie to the east of the N—S line. The markings and scales are so selected that the degree markings on the compass rose now represent altitude, N representing sea level, 1 (or 10 degrees) representing 1000 feet altitude, 2 (or 20 degrees) representing 2000 feet altitude, and so on.

To take a specific problem, assume that the true indicated airspeed at 8000 feet altitude under standard temperature conditions is 100 M. P. H. The problem is to find what the airspeed at sea level would be.

Having the "ground" disk base line properly oriented on the N—S line of the compass rose as above-described, the base line of the "wind" disk is placed on the altitude marking, here at 8000. This sets up a system of parallelograms. The "airplane" arm base line is now placed on the degree marking on the compass rose which represents this altitude, here at 8. From the point 10 (100 M. P. H.) on the "airplane" arm base line, a line on the "wind" disk is followed to its point of intersection with the N—S base line of the "ground" disk. This point of intersection represents the airspeed at sea level.

This problem is diagrammatically illustrated in Fig. 10, where OA represents the airspeed at the given altitude and OB represents the airspeed at sea level.

The above examples illustrate certain uses of the device but they are not exclusive of other uses, many of which are known but which cannot be described within the limits of an illustrative exposition.

Moreover, while one embodiment of the invention has been described, it is to be understood that there may be various embodiments within the limits of the prior art and the scope of the subjoined claims.

I claim:

1. A computing device comprising in combination, a compass rose disk, and a plurality of upper disks mounted to turn about the axis of said compass rose disk, two of said upper disks being provided with diametral base lines and spaced lines parallel thereto, and one of said upper disks being transparent, one of said upper disks being provided on the edge with indicia of altitude spaced apart by degrees cooperating with the markings on said compass rose.

2. A computing device comprising in combination, a first or bottom flat circular sheet member having compass markings upon its upper surface around its outer edge, a second flat circular sheet member pivoted at its center upon the center of said bottom member and having a diametral scaled base line and a plurality of spaced lines on each side parallel to said base line, said second member being transparent at least above the compass markings on said first member, said second member being of larger diameter than said first member, a third flat sheet member pivoted at the center of the first and second members and having a scaled radial line, said third member being transparent and having a projection beyond all others of said members, and a fourth flat circular sheet member pivoted at its center to said other members and having a scaled diametral base line and a plurality of lines on each side parallel thereto, said fourth member being transparent and of smaller diameter than the first and second members.

3. A computing device comprising in combination, a flat circular sheet face member with markings around its outer edge, and three upper flat sheet members pivoted to the center of said base member, said upper members all having scaled radial base lines, and two of said upper members being circular and having spaced lines parallel to the base lines, the two uppermost members being transparent and the member next above the base member being transparent at least around its outer edge and being of larger diameter than the base member, one of the two uppermost members being of smaller diameter than the member therebelow and the other upper member having a long radial projection beyond all other members.

4. A computing device comprising in combination, a flat circular sheet compass rose disk having compass points in degrees marked around the outer edge, a center post on said disk, a first upper flat circular sheet disk mounted upon the center post to turn about the axis of the compass rose disk, said first upper disk having a scaled diametral base line and a plurality of parallel lines equally spaced to the same scale as said base line, said first upper disk being of a larger diameter than the compass rose disk and being transparent at least in that portion which overlies the edge markings on the compass rose disk, a flat sheet arm mounted upon the center post to turn about the axis of said compass rose disk, said arm having a base line scaled the same as that of the first upper disk, said arm being transparent above the markings of the disks therebelow and being of greater radius to provide an outwardly protruding tip, and a second upper flat circular sheet disk mounted to turn about said center post, said second upper disk having a diametral base line and a plurality of parallel lines equally spaced to the same scale as those of the lower disks, said second upper disk being transparent and of smaller diameter than the first upper disk.

5. A computing device comprising in combination, a flat circular sheet compass rose disk having compass points in degrees marked around the outer edge, a center post on said disk, a first upper flat circular sheet disk mounted upon the center post to turn about the axis of the compass rose disk, said first upper disk having a scaled diametral base line and a plurality of parallel lines equally spaced to the same scale as said base line, said first upper disk being of a larger diameter than the compass rose disk and being transparent at least in that portion which overlies the edge markings on the compass rose disk, a flat sheet arm mounted upon the center post to turn about the axis of said compass rose disk, said arm having a base line scaled the same as that of the first upper disk, said arm being transparent above the markings of the disks therebelow and being of greater radius to provide an outwardly protruding tip, and a second upper flat circular sheet disk mounted to turn about said center post, said second upper disk having a diametral base line and a plurality of parallel lines equally spaced to the same scale as those of the lower disks, said second upper disk being transparent and of smaller diameter than the first upper disk, and said first upper disk being provided on the edge with angularly spaced indicia of altitude cooperating with the markings on said compass rose.

6. A computing device comprising in combination, a flat circular compass rose sheet disk having compass markings around its outer edge, a pivot post at the center of said compass rose disk, a flat circular ground or ground speed track sheet disk pivoted at its center to said post, said ground disk being transparent at its outer edge and having a diametral base line and spaced lines on each side parallel thereto, a flat heading or airspeed sheet arm pivoted to said post and extending outward beyond said disks at its outer end, said arm being transparent and having a scaled radial base line, and a flat circular wind or wind speed sheet disk pivoted at its center to said post, said wind disk being transparent and having a scaled diametral base line and spaced lines on each side parallel thereto, said wind disk being of smaller diameter than the other disks.

MICHAEL WATTER.

REFERENCES CITED

The following references are of record in the file of this patent:

UNITED STATES PATENTS

| Number | Name | Date |
|--------|------|------|
| 1,074,439 | Kincaid | Sept. 30, 1913 |
| 1,098,621 | Gist | June 2, 1914 |
| 1,428,449 | Prall | Sept. 5, 1922 |
| 1,575,911 | Gomez | Mar. 9, 1926 |
| 1,644,791 | Petschenig | Oct. 11, 1927 |
| 2,007,986 | Sprague | July 16, 1935 |